United States Patent [19]

Yang et al.

[11] Patent Number: 4,714,314

[45] Date of Patent: Dec. 22, 1987

[54] MODE DEPENDENT, OPTICAL TIME DELAY SYSTEM FOR ELECTRICAL SIGNALS

[75] Inventors: Andrew C. Yang, Concord; Richard Payne, Sudbury; Richard A. Soref, Newton, all of Mass.

[73] Assignee: The United States of America as represented by the Secretary of the Air Force, Washington, D.C.

[21] Appl. No.: 698,721

[22] Filed: Feb. 6, 1985

[51] Int. Cl.$^4$ .......................... G02B 6/36; G02B 7/26
[52] U.S. Cl. ........................ 350/96.20; 372/700
[58] Field of Search ............ 350/96.15, 96.20, 96.29, 350/174, 385, 386; 372/43, 700

[56] References Cited

U.S. PATENT DOCUMENTS

| | | | |
|---|---|---|---|
| 3,777,149 | 12/1973 | Marcatili | 250/209 |
| 3,781,722 | 12/1973 | Pierson | 333/31 R |
| 3,878,520 | 4/1975 | Wright et al. | 343/854 |
| 4,028,702 | 6/1977 | Levine | 343/100 SA |
| 4,050,782 | 9/1977 | Uchida et al. | 350/96 C |
| 4,053,764 | 10/1977 | Sierak et al. | 250/227 |
| 4,127,320 | 11/1978 | Li | 350/96.13 |
| 4,128,759 | 12/1978 | Hunt et al. | 250/199 |
| 4,253,727 | 3/1981 | Jeunhomme et al. | 350/96.29 |
| 4,258,363 | 3/1981 | Bodmer et al. | 343/16 R |
| 4,268,116 | 5/1981 | Schmadel et al. | 350/96.29 |
| 4,294,513 | 10/1981 | Nelson et al. | 350/96.15 |
| 4,302,071 | 11/1981 | Winger | 350/96.20 |
| 4,344,671 | 8/1982 | Lang | 350/174 |
| 4,408,829 | 10/1983 | Fitzgerald et al. | 350/96.29 |
| 4,410,235 | 10/1983 | Klement et al. | 350/96.20 |
| 4,449,210 | 5/1984 | Myer | 350/96.29 |
| 4,522,026 | 11/1985 | Knudsen et al. | 350/96.15 |
| 4,530,078 | 7/1985 | Lagakos et al. | 350/96.29 |
| 4,586,783 | 5/1986 | Campbell et al. | 350/96.15 |

OTHER PUBLICATIONS

Botez et al., "High-Power Phase-Locked Arrays of Index-Guided Diode Lasers", *Applied Physics Letters*, 43, 1983, pp. 1096–1098.

Katz, J., "Phase-Locked Semiconductor Laser Array with Separate Contacts", *Applied Physics Letters*, vol. 43, No. 6, Sep. 15, 1983, pp. 521–523.

Sheehan, P. G. et al, "The Use of Optical Techniques for Beamforming in Phased Arrays," *SPIE*, vol. 477, 1984, pp. 82–89.

Popa, Adrian E., "Fiber Optics Implications for Radar Equipment Design," *Electro-81 Conference Record*, New York, New York, Apr. 7–9, 1981, pp. 1–6.

Suemune et al., "Semiconductor Light Sources with Capabilities of Electronic Beam Scanning," *Electronics Letters*, 19, 1983.

Primary Examiner—William L. Sikes
Assistant Examiner—Robert E. Wise
Attorney, Agent, or Firm—Jacob N. Erlich; Donald J. Singer

[57] ABSTRACT

A mode dependent, optical time delay system for electrical signals having a highly multi-mode optical fiber having a step index profile in optical alignment with an optical source which is capable of converting an incoming electrical signal into an optical signal. By incorporating within the system a number of different components to alter or control the mode angles of the incoming optical signal, the resultant optical output signal is time delayed as it propagates through the optical fiber. This optical output signal is thereafter converted into an electrical output signal which is also time delayed in direct relation to the mode angle of the optical signal propagating through the optical fiber.

11 Claims, 5 Drawing Figures

4,714,314

MODE DEPENDENT, OPTICAL TIME DELAY SYSTEM FOR ELECTRICAL SIGNALS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to time delay systems, and, more particularly, to an optical time delay system for electrical signals which converts these electrical signals into optical signals in order to provide a mode dependent time delay.

There are numerous electronic devices and components in which it is desirable to utilize an electronic signal which has been delayed in time by a prescribed and controllable amount. A controlling signal is used to select the delay. Heretofore the time delaying of electrical signals has been accomplished by several methods including (1) the switching-in of different lengths of coaxial cable in the manner described in U.S. Pat. No. 3,781,722; and (2) the operation of electronic circuit components such as integrated circuits, discrete transistors, and charge-coupled devices.

Some of the more commonly referred to delay circuits include: (1) the multivibrator delay circuit in which a cathode-coupled or emitter-coupled monostable multivibrator may be used as an approximately linear delay circuit; (2) a linear time delay circuit which makes use of a linear saw tooth generator, such as the boot strap or Miller integrator, whose output is compared with a calibrated DC reference voltage level; (3) a circuit that combines the functions of a gate waveform generator, a clamp, and a linear saw tooth generator; and (4) a circuit that combines the Miller integrator saw tooth generator with the gating function and wherein the output is applied to a comparator in a complete linear time delay circuit.

Unfortunately the deficiencies of the prior art electronic delay circuits are numerous. For example, the coaxial devices are bulky and suffer from attenuation and distortion at high frequencies. The electronic devices have cost and complexity factors which markedly increase as the signal bandwidth and/or frequency go up to 1 GHz and beyond. In fact, in some cases the signal amplitude may be adversely affected, and equalization systems or circuits may also be required. The delays in such electronic circuits are many times selected with a potentiometer, rather than being under computer control. In the charge-coupled device approach, very complicated clocking networks are required which cause a considerable drawback. In the SAW devices it is extremely difficult to alter the delay factor. Generally in all such electronic time delay circuits, it is difficult to obtain ultra short delays in the 0.05 ns range. Furthermore, without using free-space propagation, it is difficult to provide remote transmission of the delay signal.

Consequently, and as is clearly evident by the above analysis of such electronic time delay devices, the prior art electronic devices do not satisfy the simultaneous requirements of compactness, simplicity, remote "invulnerable" transmission, multi-gigahertz bandwidth, constant amplitude, cost effectiveness, ultra short delays, numerous delay steps, low-power computer control and rapid updating of delay that is generally required in some of the newer "optical/microwave" systems.

One such new application of electrical time delay circuits can be found in the optical/microwave phased-array antenna. In such a hybrid antenna there are stringent requirements of computer-control, viable coupling and, of course, variable delay devices for steering the radiation beam. Furthermore, rapid changes in beam pointing direction are desirable, and such a factor imposes a rapid transition time on the programmable devices incorporated therein. In fact, transition times as short as 1 ns are desirable, although 0.01 to 10 microseconds would be acceptable in some cases. Still further, there are instances in which bandwidth of at least 2 GHz is needed, together with discrete accurate control of the time delay. Even further, approximately 100 equal steps of delay per device are frequently required, with the minimum step being about 0.05 ns. In conjunction with all of the above requirements it is generally conceded that the control power should be less than 0.05 watts. As is clearly evident from the above explanation of the prior art electronic devices, such purely electronic time delay circuits fall short in requirements for the new "optical/microwave" systems in use today and in the future.

It has been recognized in the prior art, as exemplified by U.S. Pat. No. 3,777,149 issued to Marcatili and U.S. Pat. No. 4,050,782 issued to Uchida et al, that an optical input into a fiber over the entire angular range of the fiber by a wide-angle optical source produces an optical output which is decomposed into angular ranges or "packets." Both of the above patents are directed toward equalizing the inherent differences in modal delay time of the fiber by adding unequal lengths of fiber to the various focused modes (Uchida et al), or by adding unequal delay networks (Marcatili) to those separated detected modes. In both of these patents, however, there is no desire or system disclosed to produce unequal time delays in an incoming electrical signal. Consequently, it is readily apparent that a need still arises for an effective and reliable optical time delay system for electrical signals.

SUMMARY OF THE INVENTION

The present invention overcomes the problems set forth in detail hereinabove by providing a mode dependent, optical time delay system for electrical signals. By converting the electrical signal into an optical signal, the time delay can be dependent upon the mode of the optical signal propagating through a highly multi-mode fiber with step index profile. By then relying upon the optical signal for the time delay and thereafter converting this optical signal back into an electrical signal the present invention is capable of providing extremely short time delays capable of meeting the need of the new "optical/microwave" systems in use today and in the future.

The present invention is a time delay system which is capable of controlling the time delay of an electrical signal in the range of 10 ps to 100 ns. The invention is based upon the fact that once the electrical signal is converted into an optical signal and is input into a highly multi-mode optical fiber with step index profile, as this optical signal propagates through the highly multi-mode fiber, higher-order modes travel more slowly along the fiber than lower-order modes. It is this differential mode delay that is capable of being preserved, and when this optical output signal is converted back into an electrical signal, the electrical signal is time delayed in direct relationship to the particular mode of the optical signal passing through the fiber.

In the first embodiment of the present invention an optical source, in the form of a semiconductor laser diode, converts the electrical signal into an optical signal which is launched into the highly multi-mode optical fiber at a high angle input launch. This fiber, which is wrapped around a mandrel or the like under tension, has applied thereto, at a number of discrete locations, electro-mechanical or magneto-mechanical transducers so as to provide localized microbending of the fiber. At those particular locations at which the microbending occurs, a mode scrambling also occurs at which high-order modes are converted to lower-order modes, or low order modes are converted to high-order modes.

In such high-low conversion, for example, the light pulse or optical signal will travel faster beyond the disturbance than before. Due to the variety of modes converted, and due to the wide-angle acceptance of the optical signal from the photodiode, pulses will be speeded up or slowed down by various amounts. Consequently, by the appropriate application of microbending to the fiber by the above-mentioned transducers, the optical signal can be time delayed by a preselected amount. Thereafter, conversion of the optical signal back into an electrical signal will create a time delay of the electrical signal.

In alternative embodiments of the present invention the microbending of the optical fiber is eliminated and the laser diode source is replaced with particular variable-angle optical light emitting sources. Consequently, the electrical input signal can be converted into an optical signal either by a steerable beam laser diode or a laser diode array which can also be utilized in the present invention in conjunction with a lens in order to inject the optical signal into the fiber at a variety of input angles. By providing a lens at a distance 2f from the optical source and at a distance of 2f from the fiber input, the output angle of the optical source will be reproduced at the fiber input. Consequently, the fiber is mode preserving and is not significantly perturbed while the mode of the input optical signal can be controlled.

To obtain an even larger number of delay steps, the mode dependent, optical time delay system of the present invention can be combined in an optical series arrangement with the time delay system for electrical signals as set forth in U.S. patent application Ser. No. 698,979, now U.S. Pat. No. 4,671,604 entitled "Wavelength Dependent, Tunable, Optical Time Delay System for Electrical Signals" filed on the same date as this invention by one of the present inventors or the present invention may be combined with the time delay system for electrical signals as set forth in U.S. patent application Ser. No. 698,977, now U.S. Pat. No. 4,671,605 entitled "Length Dependent, Optical Time Delay/Filter Device for Electrical Signals" also filed on the same date as this invention by one of the present inventors.

It is therefore an object of this invention to provide an optical time delay system for electrical signals which relies upon controlling of the mode of an optical signal which propagates through a highly multi-mode optical fiber in order to establish the time delay.

It is another object of this invention to provide a mode dependent, optical time delay system for electrical signals which can generate "true time delays" in the 10 ps to 100 ns range.

It is a further object of this inventon to provide a mode dependent, optical time delay system for electrical signals in which the time delay can be easily and reliably selected by controlling the mode of the optical signal passing through the fiber.

It is a further object of this invention to provide a mode dependent, optical time delay system for electrical signals in which the switching times are extremely fast.

It is still a further object of this invention to provide a mode dependent, optical time delay system for electrical signals which can be readily incorporated within other optical systems.

It is an even further object of this invention to provide a mode dependent, optical time delay system for electrical signals which is extremely simple in its structural configuration.

It is still another object of this invention to provide a mode dependent, optical time delay system for electrical signals which is economical to produce and which utilizes conventional, currently available components that lend themselves to standard mass production manufacturing techniques.

For a better understanding of the present invention, together with other and further objects thereof, reference is now made to the following description taken in conjunction with the accompanying drawings and its scope will be pointed out in the appended claims.

DETAILED DESCRIPTION OF THE PREFERRED EMBODIMENTS

Figure 1:
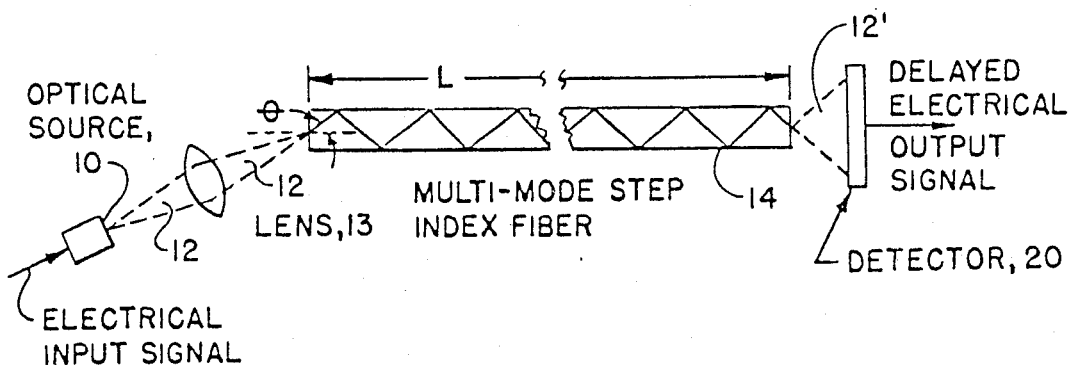
FIG. 1 is a schematic illustration of the mode dependent, optical time delay system for electrical signals of the present invention.

In order to better understand the present invention, reference is first made to FIG. 1 of the drawings and the following analysis and geometric considerations involved in establishing relative time delay between a series of incoming optical signals into a highly multi-mode optical fiber with step index profile. In general, with the present invention and as illustrated in FIG. 1, an electrical input signal is received by any suitable conventional optical source such as a laser diode 10 typically of 2–10 mW output in which the electrical input signal is converted into an optical signal 12. This optical signal 12 passes through a lens 13 which focuses the optical signal at the end of a multi-mode optical fiber 14 having a step index profile. More specifically, the optical signal 12 impinges upon the optical fiber 14 at a high input angle $\theta$.

Fiber 14 is a high quality step index fiber with low intermodal diffusion, such as the Corning type 5 optical fiber, with 0.21 NA, 50 μm D core and 125 μm D cladding. Such a fiber will preserve the modes that are propagating therethrough with little mixing over 1 km, unless the axis of the fiber is bent in certain ways in the manner illustrated in greater detail hereinbelow with respect to FIGS. 2 and 3 of the drawings.

In order to clearly set forth the geometric considerations involved in the present invention it is first necessary to illustrate that the relative time delay, Δt, between the highest order mode and the lowest order mode (that is, on axis) is given by the following equation:

$$\Delta t = nL\theta^2/2c$$

where
 174 = the ray angle of a high-order propagating mode within fiber 14;
 L = the length of fiber 14;
 n = the core index of fiber 14; and
 c = the velocity of light.

The fiber's numerical aperture is given by the expression $$NA = \sin \phi_m$$

where
 $\phi_m$ is the maximum external mode-angle, and $$\phi = n\theta.$$

Therefore, as an example, for $\phi_m = 0.20$ radians, we find that Δt = 44 nanoseconds per kilometer of fiber. Thus depending on the mode angle, θ, the relative delay as the optical signal passes through the fiber 14 will vary between 0 and 44 ns/km. Consequently to get the desired delay within the present invention, it is necessary that we select the appropriate mode angle θ and tailor the fiber length L.

More specifically, as pointed out hereinabove, fiber 14 will preserve the modes that are propagating therethrough with little mixing over 1 km unless the axis of the fiber is bent in certain ways. This local bending is accomplished by winding the optical fiber 14 under tension over a mandrel or small drum 16 as illustrated in FIG. 2 of the drawings with a series of either electro-mechanical or magneto-mechanical transducers 18 situated so as to effect a localized microbending of optical fiber 14.

As pointed out hereinabove and as illustrated in FIG. 1 of the drawings, a narrow cone of light (optical signal 12) from an internally modulated laser diode 10 is launched into the step index fiber 14 at a high angle θ. This launching is done directly or with a lens 13 so that the light is transferred with low loss directly into fiber 14. The laser output is typically a short, steep-rise pulse. At the output end of fiber 14 there is a detector 20 in the form of, for example, a photodiode whose collection optics or sensing area is sufficient to gather all propagating modes of fiber 14, highest to lowest, simultaneously. Once received, the optical output signal 12' is converted into an electrical output signal in photodiode or detector 20.

Figure 2:
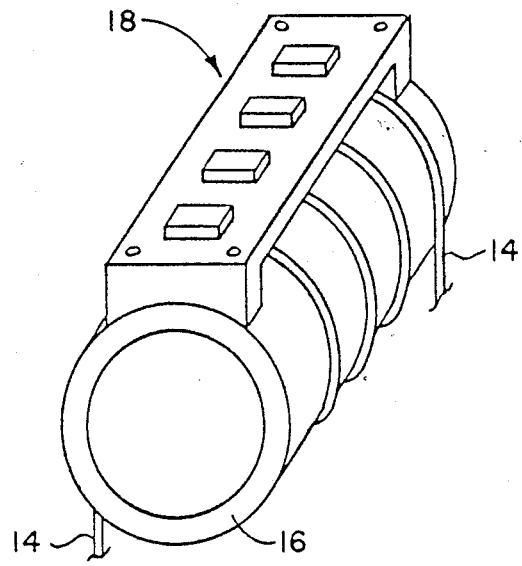
FIG. 2 is a pictorial representation of the mode dependent, optical time delay system for electrical signals of the present invention.
Figure 3:
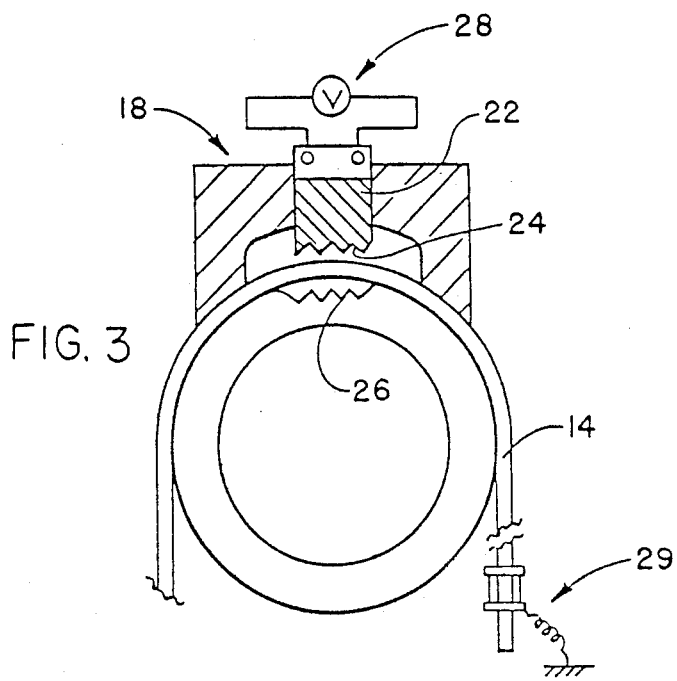
FIG. 3 is an end view of the mode dependent, optical time delay system for electrical signals of the present invention, illustrating in exaggerated fashion the means for producing microbending of the optical fiber.

Switching of modes within fiber 14 is accomplished by the present invention in the manner illustrated in FIGS. 2 and 3 of the drawings. By the incorporation within the present invention of either electro-mechanical or magneto-mechanical transducers 18 microbending of fiber 14 can be performed. More clearly shown in FIG. 3 of the drawings is one of the series of transducers in the form of a solenoid-actuated mechanical plunger 22 which has teeth 24 on the bottom thereof. Teeth 24 matingly engage a series of teeth recesses 26 located on the exterior surface of drum or mandrel 16. It should be realized, that the description of the plunger is greatly exaggerated in order to clearly show the details thereof. In actuality, the microbending of fiber 14 is barely visible.

Upon activation of plunger 22, the plunger will force the teeth 24 to microbend fiber 14 and thereby alter the mode of the optical signal passing through fiber 14. Since there are a series of such transducers or mechanical plungers 18 associated with the present invention the mode can be changed in a preselected manner so as to influence the time of propagation of the optical signal through fiber 14.

At zero voltage, for example, there is no activation of the plunger 22 and consequently the fiber remains unperturbed. With sufficient voltage applied from voltage source 28, movement of plunger 22 will create a localized microbending of fiber 14. As a consequence, mode scrambling occurs at the location of microbending and the higher-order modes are converted to lower-order modes and vice versa. This high-low conversion means that the light pulse will travel faster beyond the disturbance than before. Due to the variety of modes converted, and due to the wide-angle acceptance of the photodiode output, there will be pulses which are speeded up by various amounts, a superposition of delay pulses or a composite pulse.

If we utilize the highest order mode ($\theta = \theta_m$) as a reference, (undisturbed pulse) we will get a well defined delay if we detect the leading edge of the composite pulse. In such a case, a simple analysis shows that the leading edge is speeded up by a amount Δt with respect to the undisturbed pulse, where Δt equals $nL_2\Delta^2/2c$ utilizing the formula set forth above in determining time (where $L_2$ is the distance from the microbend to the end of the fiber). We now obtain several discrete steps of time delay in the embodiment illustrated in FIGS. 2 and 3 of the drawings by placing transducers at various fiber locations.

To obtain mode conversion at a particular spot, it is necessary to deform fiber 14 by a certain amount. A physical distortion of 10-20 μm (motion) is all that is generally needed. As pointed out above, there are several ways to accomplish such microbending. One such device being in the form of solenoid-actuated mechanical plungers as illustrated in FIG. 3 of the drawings and the other by voltage-actuated PZT piezoelectric extenders.

As illustrated in FIG. 2 of the drawings, fiber 14 is wound around a mandrel or drum 16 and placed under tension by any suitable spring biased device 29 or the like illustrated schematically in FIG. 3 of the drawings. This tension provides a restoring force to fiber 14 once plunger 22 with its teeth 24 are moved away. In such an embodiment, as depicted with respect to FIGS. 2 and 3 of the drawings, although a force is derived by plungers or transducers 18 it is possible to use a variety of other microbending techniques. It is also possible to have ten microbending locations or perhaps as many as a hundred if these elements are miniaturized.

The type of time delay system as illustrated in the above-mentioned Figures is extremely reliable although in some instances it may be considered somewhat slow. This is as a result of the deflecting time and the motion involved, but it is still likely that a fast response time of 1 millisecond can be achieved. As to the delay time, if we use 10 centimeters as the minimum separation between deflecting elements, then, from the above mentioned formula, the delay increment would be 4.4 ps, and for a 1 kilometer separation, it would be 44 ns.

Figure 4:
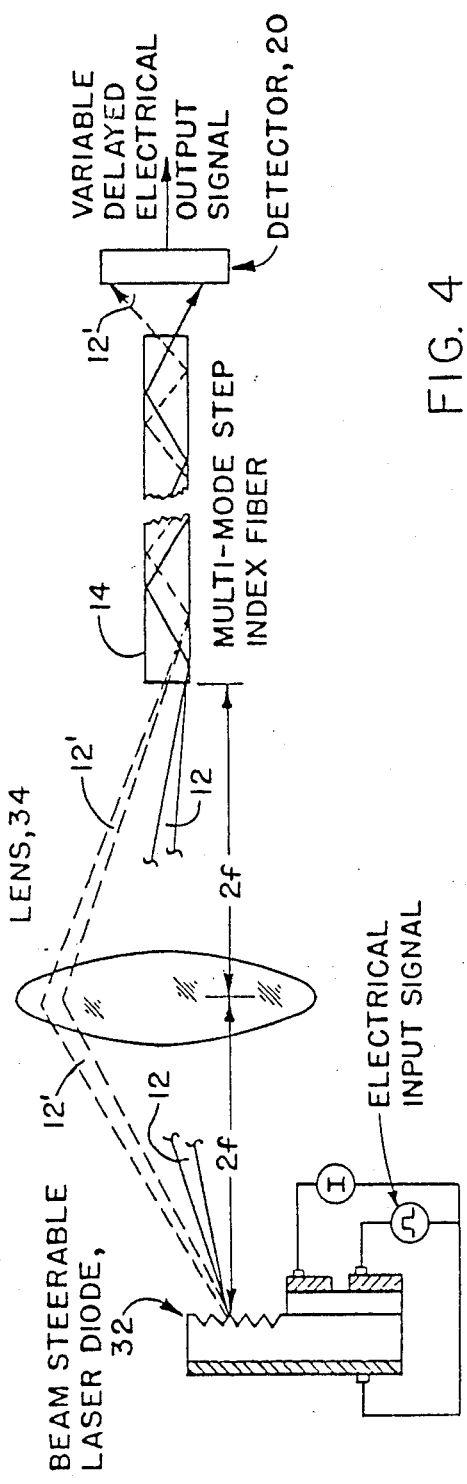
FIG. 4 is a schematic representation of an alternate embodiment of the present invention providing for a mode dependent, optical time delay system for electrical signals.
Figure 5:
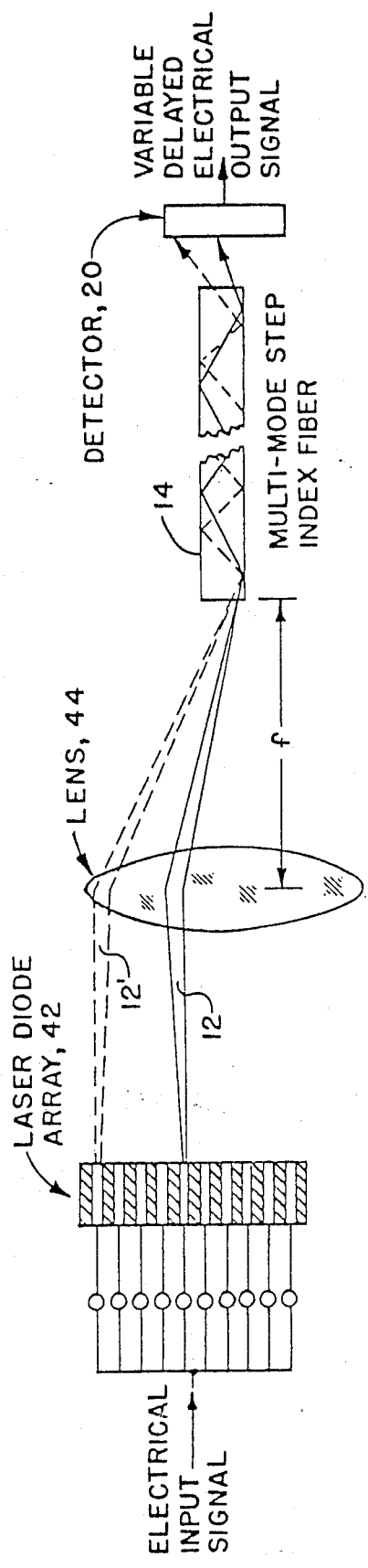
FIG. 5 is a schematic representation of a further alternate embodiment of the present invention for providing a mode dependent, optical time delay system for electrical signals.

In order to improve upon the change of delay rates, reference is now made to FIGS. 4 and 5 of the drawings. These Figures illustrate two non-mechanical approaches that provide a higher delay switching rate. In both of these instances deflection or movement of the optical signal occurs at the fiber input rather than at the fiber itself.

Since many of the elements set forth with respect to the embodiments depicted in FIGS. 4 and 5 are identical to those set forth in the time delay system of FIGS. 1–3, for clarity and ease of understanding of the alternate embodiments of the present invention, elements which are identical to those described with reference to FIGS. 1–3 will be given the same numerals in all Figures of the drawings.

The first structure is depicted schematically in FIG. 4 of the drawings and utilizes a beam-steerable laser diode 32 for receiving the incoming electronic signal and converting the electrical signal into an optical signal which can have its input angle of incidence varied prior to coupling into multimode step index fiber 14. As with the embodiment illustrated in FIGS. 1–3 of the drawings a lens 34 is interposed between steerable laser diode 32 and fiber 14. This lens 34 is a distance of 2f from laser diode 32 as well as from the input end of fiber 14, where f represents the focal length of lens 34. Reference can be made to an article co-authored by Suemune, Kan and Yamanishi, "Semiconductor Light Sources with Capabilities of Electronic Beam-Scanning," *Electronic Letters*, 19, 1983 for an example of a superluminescent diode steered over a 10° angle.

Consequently, as the output from the beam-steerable laser diode 32 varies, the mode angle at which the optical signal propagates through optical fiber 14 also varies. Such a variance of mode or input angle creates a time delay within the optical signal as it propagates through fiber 14. Any suitable detector or photodiode 20 receives the optical signal 12′ output from fiber 14 and converts this optical signal into an electrical output signal which is now time delayed.

In another embodiment of the present invention as illustrated in FIG. 5 of the drawings, the beam-steerable laser diode 32 is replaced by a closely spaced, linear array of miniature laser diodes 42. This laser diode array 42 receives the incoming electrical signal and the particular laser diode in which the electrical signal is converted into an optical signal determines the actual input angle of the optical input signal 12. This is accomplished by placing a lens 44 which is focused at infinity at a distance f from the fiber input (or a quarter-pitch grin-rod lens). Lens 44 can transform the various parallel collimated beams emanating from laser diode array 42 into different input angles (slots) at the input end of fiber 14 as illustrated in FIG. 5. Reference is made to an article by Botez and Connolly, "High-Power Phase-Locked Arrays of Index-Guided Diode Lasers," *Applied Physics Letters*, 43, 1983, pages 1096–1098 for an example of nine laser diodes arranged monolithically side-by-side with phase locked outputs. These particular laser diodes could be independently controlled by configuring a separate current lead for each laser diode.

By selecting a particular laser diode for converting the incoming electrical signal into an optical signal, it is possible to launch this optical signal into fiber 14 at a different one of a plurality of different input angles. Consequently, as the optical signal propagates through fiber 14 based upon its input angle or mode, the output optical signal received by detector or photodiode 20 will be time delayed a preselected amount based upon this mode and based upon the particular laser diode selected for providing the input optical signal. Thereafter the optical signal is converted by photodiode 20 into an electrical output signal which is time delayed in relation to the mode of the incoming optical signal.

Although this invention has been described with reference to particular embodiments, it will be understood that this invention is also capable of further and other embodiments within the spirit and scope of the appended claims.

We claim:

1. A mode dependent, optical time delay system for electrical signals comprising:

a highly multi-mode optical fiber having a step index profile and a longitudinal axis;

means for receiving an incoming electrical signal, converting said electrical signal into an optical signal, and feeding said optical signal into one end of said multi-mode optical fiber at a predetermined angle with respect to said longitudinal axis of said fiber;

means located a predetermined distance, L, from the other end of said multi-mode optical fiber for preselectively controlling the mode of said optical signal passing through said multi-mode fiber; and means positioned in optical alignment with the other end of said multi-mode optical fiber for receiving said optical signal after propagating therethrough and for converting said optical signal into an electrical output signal, said electrical output signal being time delayed by a predetermined amount, $\Delta t$, in direct relation to the mode of said optical signal propagating through said multi-mode optical fiber, said mode being altered by said mode controlling means and said amount of time delay, $\Delta t$, being equal to $nL\theta^2/2c$, wherein n equals the core index of said fiber; $\theta$ equals the ray angle of said mode propagating through said fiber; and c equals the speed of light.

2. A mode dependent, optical time delay system for electrical signals as defined in claim 1 wherein said mode controlling means comprises means for locally microbending said multi-mode optical fiber.

3. A mode dependent, optical time delay system for electrical signals as defined in claim 2 wherein said optical fiber microbending means comprising a movable plunger adjacent said multi-mode optical fiber.

4. A mode dependent, optical time delay system for electrical signals as defined in claim 3 wherein said optical fiber microbending means further comprises means for wrapping said optical fiber therearound under tension.

5. A mode dependent, optical time delay system for electrical signals as defined in claim 4 wherein said optical fiber wrapping means comprises a mandrel, said mandrel having means therein to receive said movable plunger.

6. A mode dependent, optical time delay system for electrical signals as defined in claim 5 wherein said optical fiber microbending means comprises a plurality of said movable plungers.

7. A mode dependent, optical time delay system for electrical signals as defined in claim 6 further comprising a focusing element optically interposed between said receiving, converting and feeding means and said optical fiber.

8. A mode dependent optical time delay system for electrical signals comprising:
   a highly multi-mode optical fiber having a step index profile, a predetermined length, L, and a longitudinal axis;
   means for receiving an incoming electrical signal, converting said signal into an optical signal, and feeding said optical signal into one end of said multi-mode optical fiber;
   means for preselectively controlling the mode of said optical signal passing through said multi-mode optical fiber by preselectively varying the angle at which said optical signal is fed into said one end of said multi-mode optical fiber; and
   means positioned in optical alignment with the other end of said multi-mode optical fiber for receiving said optical signal after propagating therethrough and for converting said optical signal into an electrical output signal, said electrical output signal being time delayed by a predetermined amount, $\Delta t$, in direct relation to the mode of said optical signal propagating through said multi-mode optical fiber, said mode being altered by said mode controlling means and said amount of time delay, $\Delta t$, being equal to $nL\theta^2/2c$ wherein n equals the core index of said fiber; $\theta$ equals the ray angle of said mode propagating through said fiber; and c equals the speed of light.

9. A mode dependent, optical time delay system for electrical signals as defined in claim 8 wherein said receiving, converting and feeding means and said mode controlling means are incorporated within the same component.

10. A mode dependent, optical time delay system for electrical signals as defined in claim 9 wherein said component comprises a beam steerable laser diode.

11. A mode dependent, optical time delay system for electrical signals as defined in claim 9 wherein said component comprises a laser diode array.

* * * * *